US008566829B1

(12) United States Patent
Forecast et al.

(10) Patent No.: US 8,566,829 B1
(45) Date of Patent: Oct. 22, 2013

(54) COOPERATIVE MULTI-LEVEL SCHEDULER FOR VIRTUAL ENGINES

(75) Inventors: John Forecast, Newton, MA (US); Michael Evans, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 1204 days.

(21) Appl. No.: 12/022,265

(22) Filed: Jan. 30, 2008

(51) Int. Cl.
*G06F 9/46* (2006.01)

(52) U.S. Cl.
USPC .......................................... 718/102; 718/100

(58) Field of Classification Search
USPC ................................................. 718/100, 102
See application file for complete search history.

(56) References Cited

U.S. PATENT DOCUMENTS

| | | | | |
|---|---|---|---|---|
| 5,560,018 A * | 9/1996 | Macon et al. | | 710/260 |
| 6,269,391 B1 * | 7/2001 | Gillespie | | 718/100 |
| 6,430,593 B1 * | 8/2002 | Lindsley | | 718/103 |
| 7,876,763 B2 * | 1/2011 | Cohen et al. | | 370/395.42 |
| 2003/0236816 A1 * | 12/2003 | Venkatasubramanian | | 709/107 |
| 2008/0133889 A1 * | 6/2008 | Glew | | 712/214 |
| 2008/0270838 A1 * | 10/2008 | Dorai et al. | | 714/38 |
| 2009/0328053 A1 * | 12/2009 | Dice | | 718/104 |
| 2010/0017806 A1 * | 1/2010 | Maslov | | 718/103 |

* cited by examiner

*Primary Examiner* — Diem Cao
(74) *Attorney, Agent, or Firm* — Anderson Gorecki & Rouille LLP

(57) ABSTRACT

A device for providing a plurality of virtual machines utilizes a multi-core processor having a plurality of cores, each with a memory cache, and a shared memory resource in communication with the cores. The device utilizes a cooperative, multi-level scheduler. The multi-level scheduler includes a primary scheduler and a plurality of secondary schedulers, each supporting a subset of the physical cores. The primary scheduler assigns a group of threads to one of the processor cores. The secondary scheduler associated with the processor core to which the group of threads was assigned schedules execution of individual ones of the threads. The secondary scheduler also provides an indication of lock status to the primary scheduler. The lock status information can be used by the primary scheduler to avoid preempting a thread that holds a lock.

20 Claims, 2 Drawing Sheets

COOPERATIVE MULTI-LEVEL SCHEDULER FOR VIRTUAL ENGINES

FIELD OF THE INVENTION

This invention is generally related to the field of Network Attached Storage, and more particularly to a distributed hierarchical scheduler with cooperative components for virtual engines operating in a multi-processor/multi-core environment.

BACKGROUND OF THE INVENTION

Physical networking equipment for providing multiple, virtual network devices is well known. Virtual devices, such as virtual servers, virtual switches, and virtual routers, help to provide support for different protocols and operating systems with a smaller physical footprint, among other things. The virtual device is typically implemented in software, and different instances of virtual devices may run in the same physical device by the same physical processor chip.

A current trend in processor architecture is to enhance performance by increasing the number of execution cores on a processor chip. Increasing the number of execution cores provides at least the possibility of increasing aggregate performance without reducing cycle time. However, increasing the number of CPU cores has the effect of increasing the complexity of the task of scheduling execution of threads of control. In particular, even if each thread of control operates at a lower frequency, the number of thread scheduling events for a given work load may increase because the number of threads of control increases. This problem is evident, for example, with Network Attached Storage (NAS) equipment because contention on the run queue lock results in lock data being accessed by different cores. Coherent access to memory which may be shared across multiple cores can be costly since each core must establish unique ownership of the specific cache line while performing a read/modify/write operations on a lock. Establishing unique ownership involves checking if the specific cache line is present in any of the other cores and requesting that it be written back to memory if it has been modified. Contention is also problematic because it is desirable for locks to be granted without contention for efficient fine-grained locking, but as the number of CPU cores increases, the probability of contention increases. The result can be negation of potential performance improvement from the multi-core CPU.

SUMMARY OF THE INVENTION

In accordance with another embodiment of the invention, a method for scheduling threads comprises: with a primary scheduler, assigning a group of threads to one of a plurality of processor cores; with one of a plurality of secondary schedulers, scheduling execution of individual ones of the threads, and providing an indication of lock status to the primary scheduler.

In accordance with another embodiment of the invention, a computer-readable medium containing program code which is executed to perform operations for scheduling threads comprises: with a primary scheduler, assigning a group of threads to one of a plurality of processor cores; with one of a plurality of secondary schedulers, scheduling execution of individual ones of the threads, and providing an indication of lock status to the primary scheduler.

In accordance with another embodiment of the invention, apparatus for providing a plurality of virtual machines comprises: a multi-core processor having a plurality of cores, each with a memory cache; and a shared memory resource in communication with the cores; wherein a primary scheduler assigns a group of threads to one of the processor cores, and a secondary scheduler associated with the processor core schedules execution of individual ones of the threads and provides an indication of lock status to the primary scheduler.

An advantage of the invention is that preemption of threads which hold spin lock is mitigated. A group of threads may become a candidate for swap out because of changing priority, expiration of time quantum, and other reasons known in the art. A swap out prompted by the master scheduler causes the secondary scheduler to stop executing on one or more cores and allows another secondary scheduler to start or resume execution. A swap out by a secondary scheduler causes a thread to stop executing on a core and allows another thread to start or resume execution. This creates a potential problem because swapping out a thread that holds one or more locks, i.e., preempting the thread, does not release the lock and may therefore prevent other threads in other CPU cores from obtaining locks on that memory space. The invention helps to mitigate this problem because, in response to the indication of lock status, the primary scheduler may postpone swap out and thereby avoid preempting a thread holding a lock. Further, the invention helps to utilize the multi-core processor design to achieve enhanced performance.

Further features and advantages of the invention will become more readily apparent from the following detailed description when taken in conjunction with the accompanying drawings.

DETAILED DESCRIPTION

Figure 1:
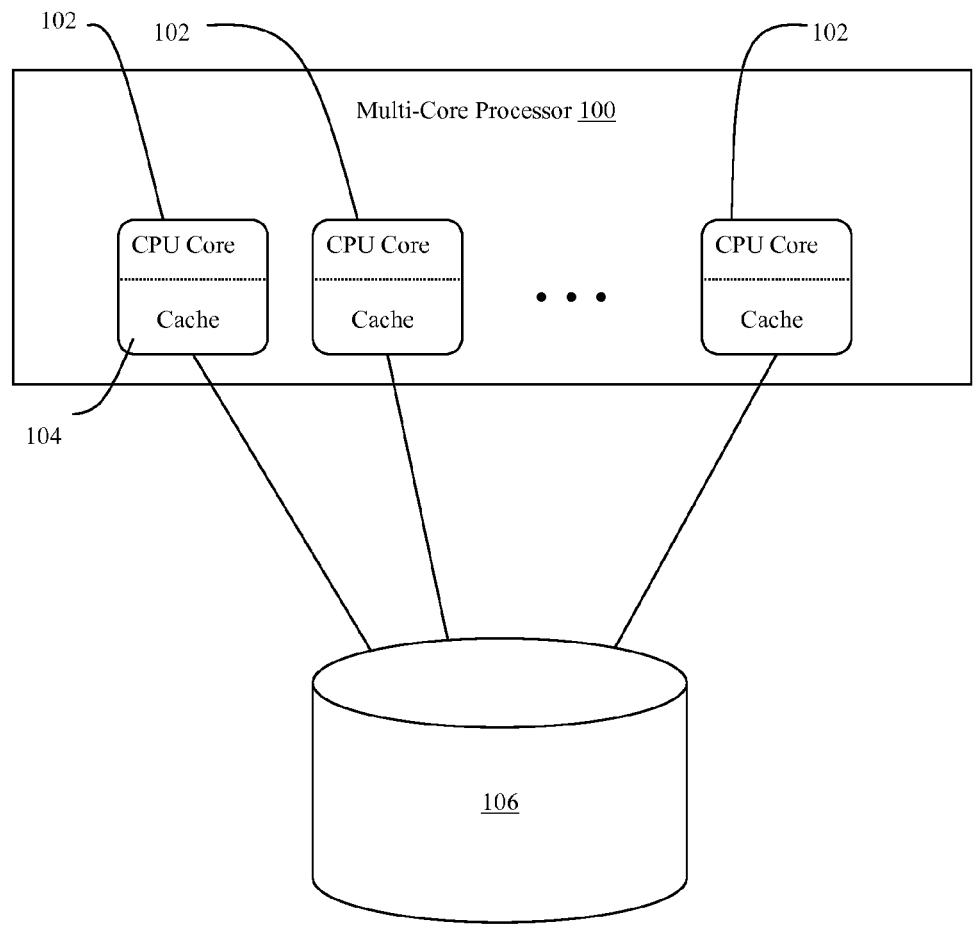
FIG. 1 illustrates hardware architecture of a device with a cooperative multi-level scheduler.
Figure 2:
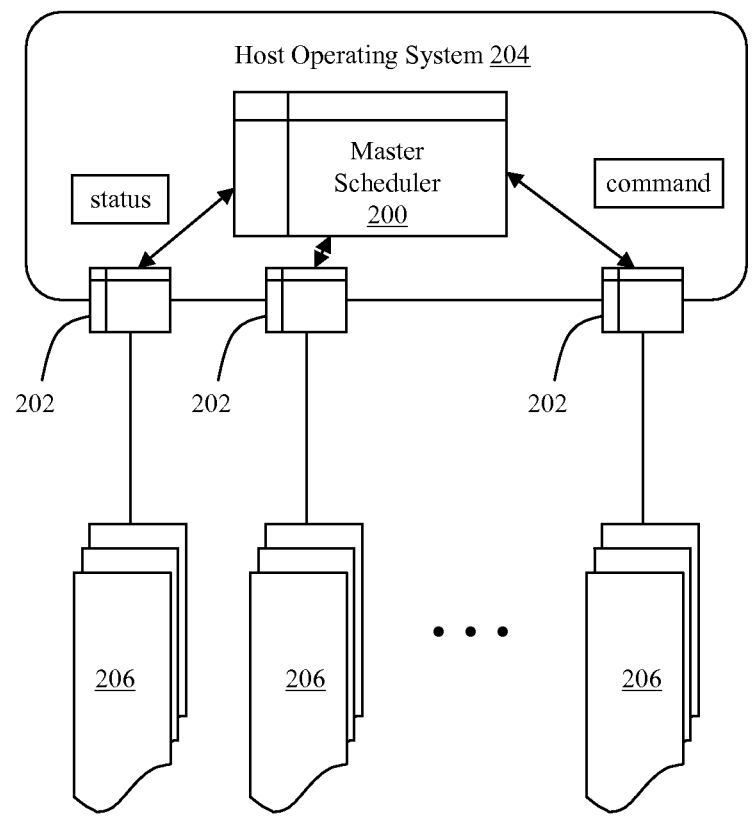
FIG. 2 illustrates software architecture of the cooperative multi-level scheduler.

Referring to FIGS. 1 and 2, a physical network device that provides multiple virtual devices includes a cooperative multi-level scheduler. The virtual devices are implemented in software which is executed by a multi-core processor (100) having N CPU cores (102), each of which is an independently functional processor. Each CPU core has memory resources including a cache (104) of relatively fast memory. The CPU cores are in communication with a relatively slower main memory resource (106).

The cooperative multi-level scheduler includes a master scheduler (200) and N secondary schedulers (202). The master scheduler (200) is implemented as part of the host operating system (204), e.g., DART. The N secondary schedulers (202) are implemented as respective parts of virtual host operating systems. In relation to the hardware, each CPU core (102) is associated with a secondary scheduler (202). The master scheduler (200) is responsible for overall scheduling at a coarse grain level. In the illustrated embodiment the master scheduler is operative to schedule entities with relatively large time quantum, e.g., ≈10 mS. The scheduling task performed by the master scheduler includes assigning groups of threads (206) to particular processor cores (102) for execution. The secondary scheduler (202), rather than the master scheduler, schedules execution of individual threads of the group (206) once they are enqueued. In particular, the secondary scheduler is responsible for allocating the large time quantum across multiple service functions.

The secondary schedulers (202) cooperate with the master scheduler (200) in order to enhance operational efficiency. One aspect of cooperation is that the secondary schedulers signal their status to the master scheduler. The master scheduler utilizes the status information to reallocate resources and swap out groups of threads. For example, if a secondary scheduler indicates that some allocated resources are not being utilized, or are not required, then the master scheduler may reallocate those resources. The status information signaled by the secondary scheduler to the master scheduler includes a busy/not busy indication of which threads are holding and waiting for spinlock, i.e., exclusive control of a portion of memory. Often, a thread will require lock on multiple different memory portions. The locks are not always granted simultaneously, so a thread may be holding one or more locks while waiting for one or more other locks. This creates a potential problem because swapping out a thread that holds one or more locks, i.e., preempting the thread, does not release the lock and may therefore prevent other threads in other CPU cores from obtaining locks on that memory space. Generally, it is desirable that the thread complete executing and release all locks before being swapped out. The secondary scheduler status signal sent to the master scheduler includes an indication of whether particular threads and the entire group of threads have released all locks and are in condition to be safely swapped out. If the status signal indicates that the thread or group is in condition for swap out, the master scheduler may prompt swap out. However, if the status signal indicates that a lock is being held then the master scheduler may delay swap out or take other action.

Another aspect of scheduler cooperation is that the secondary schedulers are operative in response to commands from the master scheduler. For example, the master scheduler can cause threads to be swapped out at any time with an interrupt. Alternatively, the master scheduler may poll the secondary schedulers for status at the end of a quantum to determine what action, if any, to take. Commands may also be issued by the master scheduler for contingent swap out. For example, the secondary scheduler could be instructed to initiate a swap out as soon as not busy.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for scheduling threads comprising:
   with a primary scheduler, assigning a group of threads to one of a plurality of processor cores;
   with one of a plurality of secondary schedulers, scheduling execution of individual ones of the threads, and providing an indication of spin lock status to the primary scheduler; and
   using the indication of spin lock status to determine whether to preempt at least one of the threads.

2. The method of claim 1 including the further step of the secondary scheduler providing an indication to the primary scheduler of whether the group of threads is ready for swap out.

3. The method of claim 1 including the further step of the secondary scheduler providing an indication to the primary scheduler of whether an individual thread of the group of threads is ready for swap out.

4. The method of claim 1 including the further step of the primary scheduler providing a command to the secondary scheduler.

5. The method of claim 1 including the further step of the primary scheduler providing a swap out command to the secondary scheduler.

6. The method of claim 1 including the further step of the primary scheduler providing a contingent swap out command to the secondary scheduler.

7. The method of claim 1 including the further step of the primary scheduler requesting status from the secondary scheduler.

8. A non-transitory computer-readable medium containing program code which is executed to perform operations for scheduling threads comprising:
   with a primary scheduler, assigning a group of threads to one of a plurality of processor cores;
   with one of a plurality of secondary schedulers, scheduling execution of individual ones of the threads, and providing an indication of spin lock status to the primary scheduler; and
   using the indication of spin lock status to determine whether to preempt at least one of the threads.

9. The computer-readable medium of claim 8 including the further operation of the secondary scheduler providing an indication to the primary scheduler of whether the group of threads is ready for swap out.

10. The computer-readable medium of claim 8 including the further operation of the secondary scheduler providing an indication to the primary scheduler of whether an individual thread of the group of threads is ready for swap out.

11. The computer-readable medium of claim 8 including the further operation of the primary scheduler providing a command to the secondary scheduler.

12. The computer-readable medium of claim 8 including the further operation of the primary scheduler providing a swap out command to the secondary scheduler.

13. The computer-readable medium of claim 8 including the further operation of the primary scheduler providing a contingent swap out command to the secondary scheduler.

14. The computer-readable medium of claim 8 including the further operation of the primary scheduler requesting status from the secondary scheduler.

15. Apparatus for providing a plurality of virtual machines comprising:
   a multi-core processor having a plurality of cores, each with a memory cache; and
   a shared memory resource in communication with the cores;
   wherein a primary scheduler assigns a group of threads to one of the processor cores, and a secondary scheduler associated with the processor core schedules execution of individual ones of the threads and provides an indication of spin lock status to the primary scheduler, and wherein preemption of at least one of the threads is based on the indication of spin lock status.

16. The apparatus of claim 15 wherein the secondary scheduler provides an indication to the primary scheduler of whether the group of threads is ready for swap out.

17. The apparatus of claim 15 wherein the secondary scheduler provides an indication to the primary scheduler of whether an individual thread of the group of threads is ready for swap out.

18. The apparatus of claim 15 wherein the primary scheduler provides a command to the secondary scheduler.

19. The apparatus of claim 15 wherein the primary scheduler provides a swap out command to the secondary scheduler.

20. The apparatus of claim 15 wherein the primary scheduler provides a contingent swap out command to the secondary scheduler.

* * * * *